(12) United States Patent
Lozano et al.

(10) Patent No.: US 11,301,655 B2
(45) Date of Patent: *Apr. 12, 2022

(54) VISION IMAGING SYSTEM HAVING A CAMERA AND DUAL AIMER ASSEMBLIES

(71) Applicant: Cognex Corporation, Natick, MA (US)

(72) Inventors: Esther Oteo Lozano, Aachen (DE); Laurens Nunnink, Simpleveld (NL); Tony Depre, Kohlscheid (DE)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,873

(22) Filed: Dec. 12, 2018

(65) Prior Publication Data

US 2019/0228195 A1 Jul. 25, 2019

Related U.S. Application Data

(63) Continuation-in-part of application No. 15/844,448, filed on Dec. 15, 2017, now Pat. No. 10,832,023.

(51) Int. Cl.
*G06K 7/10* (2006.01)
*G06K 7/14* (2006.01)
(Continued)

(52) U.S. Cl.
CPC ....... *G06K 7/10722* (2013.01); *G06K 7/1413* (2013.01); *G06K 7/1417* (2013.01);
(Continued)

(58) Field of Classification Search
CPC ....... G06K 2207/1011; G06K 7/10801; G06K 7/10811; G06K 2207/1013; G06K 7/015
(Continued)

(56) References Cited

U.S. PATENT DOCUMENTS 5,010,241 A * 4/1991 Butterworth ....... G06K 7/10594
235/454
5,949,057 A * 9/1999 Feng .................. G06K 7/10722
235/472.01
(Continued)

FOREIGN PATENT DOCUMENTS

CN 104735315 A 6/2015
EP 1791343 A2 5/2007
(Continued)

*Primary Examiner* — Suezu Ellis
(74) *Attorney, Agent, or Firm* — Loginov & Associates, PLLC; William A. Loginov

(57) ABSTRACT

A vision system for imaging feature sets on an object surface, including a first imaging system having at least a first image sensor and first optics, the first imaging system defining a standard, on-axis configuration having a system optical axis. A second imaging system defines an extended-depth of focus (DOF) configuration with second optics. A vision system processor receives and processes image data from the first imaging system and the second imaging system. A primary aimer assembly and a secondary aimer assembly that each project a discrete beam of structured light onto the surface in a relative relationship that indicates a focus distance with respect to the first imaging system and indicates an approximate center of the field of view of the second imaging system.

29 Claims, 14 Drawing Sheets

(51) Int. Cl.
*G06T 7/521* (2017.01)
*G06T 7/73* (2017.01)
*H04N 5/232* (2006.01)
*H04N 5/225* (2006.01)
*H04N 5/247* (2006.01)

(52) U.S. Cl.
CPC ............. *G06T 7/521* (2017.01); *G06T 7/73* (2017.01); *H04N 5/2253* (2013.01); *H04N 5/232121* (2018.08); *H04N 5/247* (2013.01)

(58) Field of Classification Search
USPC .......................................... 235/462.2, 462.22
See application file for complete search history.

(56) References Cited

U.S. PATENT DOCUMENTS

| | | | |
|---|---|---|---|
| 6,621,063 B2 | 9/2003 | McQueen | |
| 6,956,963 B2 | 10/2005 | Ulrich | |
| 7,058,233 B2 | 6/2006 | Silber | |
| 7,061,693 B2 | 6/2006 | Zalevsky | |
| 7,490,770 B2 | 2/2009 | Shearin | |
| 7,626,769 B2 | 12/2009 | Olmstead | |
| 7,719,670 B2 | 5/2010 | Hackney | |
| 8,027,096 B2 | 9/2011 | Feng | |
| 8,086,058 B2 | 12/2011 | George | |
| 8,192,022 B2 | 6/2012 | Zalevsky | |
| 8,408,379 B2 | 4/2013 | Malek | |
| 8,839,526 B2 | 9/2014 | Hinderling | |
| 9,118,826 B2 | 8/2015 | Griffith | |
| 9,158,953 B2 | 10/2015 | Gillet | |
| 9,202,094 B1 | 12/2015 | Chen | |
| 9,367,770 B2 | 6/2016 | Footen | |
| 9,672,398 B2 | 6/2017 | Gillet | |
| 9,726,876 B2 | 8/2017 | Bryll | |
| 9,785,814 B1 | 10/2017 | Todeschini | |
| 9,829,564 B2 | 11/2017 | Bruder | |
| 9,841,311 B2 | 12/2017 | Mccloskey | |
| 9,911,023 B2 | 3/2018 | Germaine | |
| 9,987,165 B2 | 6/2018 | Gooding | |
| 10,346,645 B1 * | 7/2019 | Nunnink | F21V 5/04 |
| 10,515,249 B2 | 12/2019 | Nagata | |
| 10,628,646 B1 | 4/2020 | Lozano | |
| 2002/0195550 A1 | 12/2002 | McQueen | |
| 2003/0019934 A1 * | 1/2003 | Hunter | G06K 7/109 |
| | | | 235/462.2 |
| 2004/0065853 A1 | 4/2004 | McQueen | |
| 2007/0164202 A1 | 7/2007 | Wurz | |
| 2007/0170259 A1 * | 7/2007 | Nunnink | G06K 7/10811 |
| | | | 235/462.21 |
| 2007/0267584 A1 | 11/2007 | Cherry | |
| 2008/0179402 A1 | 7/2008 | Barkan | |
| 2009/0168117 A1 | 7/2009 | Kearney | |
| 2010/0155481 A1 * | 6/2010 | Vinogradov | G06K 7/10722 |
| | | | 235/462.21 |
| 2013/0334314 A1 * | 12/2013 | Vinogradov | G06K 7/10 |
| | | | 235/462.21 |
| 2014/0104416 A1 | 4/2014 | Giordano | |
| 2014/0183262 A1 | 7/2014 | Wittenberg | |
| 2015/0178538 A1 | 6/2015 | Gerst, III | |
| 2015/0347799 A1 | 12/2015 | Gao | |
| 2015/0363619 A1 | 12/2015 | Lei | |
| 2016/0104019 A1 | 4/2016 | Todeschini | |
| 2016/0188943 A1 | 6/2016 | Franz | |
| 2017/0141528 A1 | 5/2017 | Hanenburg | |
| 2017/0147844 A1 | 5/2017 | Feng | |
| 2017/0193727 A1 * | 7/2017 | Van Horn | G07D 7/0043 |
| 2017/0318206 A1 | 11/2017 | Handshaw | |
| 2018/0259324 A1 | 9/2018 | Li | |
| 2019/0188432 A1 * | 6/2019 | Lozano | G06K 7/10386 |
| 2019/0228195 A1 | 7/2019 | Lozano | |
| 2019/0362117 A1 * | 11/2019 | Handshaw | G06K 7/1491 |
| 2020/0042756 A1 * | 2/2020 | Albanese | G06K 7/10732 |
| 2020/0143129 A1 * | 5/2020 | Dorado | G06K 7/10732 |
| 2020/0210663 A1 * | 7/2020 | Feng | G06K 7/10 |

FOREIGN PATENT DOCUMENTS

| | | |
|---|---|---|
| WO | 2013026180 A1 | 2/2013 |
| WO | 2013165576 A1 | 11/2013 |
| WO | 2016102988 A1 | 6/2016 |

\* cited by examiner

VISION IMAGING SYSTEM HAVING A CAMERA AND DUAL AIMER ASSEMBLIES

RELATED APPLICATION

This application is a continuation-in-part of co-pending U.S. patent application Ser. No. 15/844,448, entitled DUAL-IMAGING VISION SYSTEM CAMERA AND METHOD FOR USING THE SAME, filed Dec. 15, 2018, the teachings of which application are expressly incorporated herein by reference.

FIELD OF THE INVENTION

This invention relates to machine vision systems for use in finding and decoding ID codes on objects, and more particularly to cameras for such vision systems.

BACKGROUND OF THE INVENTION

Vision systems that perform measurement, inspection, alignment of objects and/or decoding of symbology in the form of machine-readable symbols (also termed "IDs", such as a 2D matrix symbol) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

In operation, an ID reader typically functions to illuminate the scene containing one or more IDs. The illuminated scene is then acquired by an image sensor within the imaging system through optics. The array sensor pixels is exposed, and the electronic value(s) generated for each pixel by the exposure is/are stored in an array of memory cells that can be termed the "image" of the scene. In the context of an ID-reading application, the scene includes an object of interest that has one or more IDs of appropriate dimensions and type. The ID(s) are part of the stored image.

A common use for ID readers is to track and sort objects moving along a line (e.g. a conveyor) in manufacturing and logistics operations. The ID reader, or more typically, a plurality (constellation) of readers, can be positioned over the line at an appropriate viewing angle(s) to acquire any expected IDs on the face(s) of respective objects as they each move through the field of view. The ID reader can also be provided in a handheld configuration that allows the user to move from object to object—for example on an inspection floor and vary the distance and/or relative angle between the reader and object surface at will More generally, the focal distance of the ID reader with respect to the object can vary, depending on the placement of the reader with respect to the line and the size of the object.

It is often challenging to find and decode small-scale ID codes—for example printed, peened or etched DataMatrix codes provided on parts—using either a fixed-mount ID reader or a handheld unit and at the same time preserve the capability to image larger IDs and/or at longer distances. Such small ID codes can occur in a variety of objects and parts, such as electronic and opto-electronic components used (e.g.) in display panels, solar panels, circuit boards, etc. By way of example, a "small" ID can be defined as one whose cell or bar dimensions are less than approximately 5 Mil. Such small feature dimensions generally require the ID reader optics to exhibit good depth of focus/field (DOF), and relatively good focus over a given range. Thus, sensors and optics configured to read at longer distances may lack the needed DOF for such smaller codes and/or shorter distances. In general, it is desirable that the ID reader quickly and accurately find and decode such small IDs (i.e. exhibit good snappiness).

More generally, for a given imaging optical system, focusing at a short distance significantly reduces the associated depth of focus compared with a large-focus working distance, and this is of special interest in the case of reading small codes at short distances, where also the ppm is near the limit and a slight defocus can lead to a blurry code that cannot be read. In the case of a handheld device, the user is often highly challenged to properly position and stabilize the reader so that it can adequately focus on the object—in which focused/unfocused positions may vary by no more than 2-3 millimeters.

SUMMARY OF THE INVENTION

This invention overcomes disadvantages of the prior art by providing a vision system arrangement, typically having at least two imaging systems that enable a multi-function unit. The first imaging system, typically a standard, on-axis optical configuration can be used for long distances and larger feature sets (such as ID codes) and the second imaging system is typically an extended-depth of focus/field (DOF) configuration (such as the Scheimpflug configuration). This second imaging system allows reading of smaller feature sets (such as small ID codes, under (e.g.) 5 MIL) and/or at short distances with an extended DOF. This arrangement can be used, for example, in combination with the standard imaging system to further extend the reading range of an overall (e.g.) ID-code-reading vision system. The optimization of such a vision system employs the standard imaging system for longer distances and larger codes, and the extended-DOF (Scheimpflug) imaging system for shorter distances and smaller codes. To further extend the DOF, the image sensor in the extended-DOF imaging system can be positioned with its longest dimension (in the case of a rectangular-shaped sensor) in the vertical axis (i.e. 90° from the standard configuration). Such a double-image sensor system can allow vision system processes to compute the distance from the vision system to the object to generate an autofocus setting for variable optics in the standard imaging system. The system can have an aimer to help the user to center the code in the desired axis. The aimer can be based on a structured light beam that projects a pattern onto the object surface in the region of the optical axis of the standard imaging system. The object is generally in focus if it is close to the horizontal plane containing the optical axis. By way of example, some exemplary aimer pattern shapes can include (but are not limited to) a laser beam (spot) coincident with the optical axis, a laser fan (line) coincident with the horizontal plane containing the optical axis, and two (e.g.)

parallel, spaced-apart lines, in which one resides above and one below the horizontal plane containing the optical axis. If the object/region of interest resides between the two lines, its resulting image on the Scheimpflug sensor is in-focus.

Illustratively, a vision system, which can be employed in reading ID codes, provides extended reading range for large and small codes and includes two imaging systems. A first, standard (on-axis) imaging system is provided, whose optical axis defines the full system optical axis and can have an aimer to guide the user to the center an ID code on this axis. This first standard imaging system is employed for medium and large distances and medium and larger codes. It can have an automatic focusing (autofocus) optics assembly, for example a variable (e.g. liquid) lens that is controlled by the vision system processor using distance data derived from the images and/or other external sensors. A second, extended-DOF imaging system is provided, based upon a tilted (e.g. Scheimpflug) configuration. This system can achieve extension of the focused range, and is employed for shorter distances and smaller codes. This second system is configured in such way that the object plane contains the standard imaging system optical axis. The DOF is defined by the image sensor size, so it can be configured in such way that the larger sensor dimension is used to further extend the DOF. To achieve this, the image sensor's longer axis is coplanar with the optics/lens optical axis and the first imaging system's optical axis. Depending on the distance of the code to the vision system, the code will appear in different positions along the vertical axis of the image sensor and its associated field of view. Calibrating this relationship into the vision system, the position of the code on the image is directly related to the code distance. This information can be used to compute the code size, and to optionally set the focus distance for the first imaging system.

In and illustrative embodiment, a vision system for imaging feature sets on an object surface, and associated method for the same, is provided. A first imaging system, having at least a first image sensor and first optics, defines a standard, on-axis configuration having a system optical axis. A second imaging system defines an extended-depth of focus (DOF) configuration with second optics. A vision system processor receives and processes image data from the first imaging system and the second imaging system. Illustratively, the feature sets comprise ID codes. The first imaging system is arranged to image at least one of medium distance, longer distance and larger ID codes and the second imaging system is arranged to image at least one of shorter distance and smaller ID codes. The second imaging system can be arranged according to a Scheimpflug (or equivalent, extended DOF) configuration. The second imaging system can also have a corresponding, second image sensor defining a plane that is oriented at a non-perpendicular angle with respect to an optical axis of the second optics, and an object plane of the second imaging system can be coincident with the system optical axis. The second optics can include a mirror assembly that redirects the optical axis of the second optics toward the system optical axis from an orientation that is tilted away from the system optical axis. Note that the mirror assembly is used (in this exemplary embodiment) to fold the optical path and reduce the overall dimensions/volumetric footprint of the system. The angle(s) of the mirror assembly has/have been defined in such way, that the second sensor is mounted approximately or substantially in the same plane as the first sensor (and, as such, both sensors can be mounted on the same circuit board). More generally, the second imaging system can have a mirror assembly that redirects a mounting location of the second image sensor to a location where a plane thereof is substantially parallel with a plane of the first image sensor.

Illustratively, the second image sensor can define a smaller-dimension axis and a larger-dimension axis, and the optical axis of the second optics can be coplanar with the system optical axis. The system can include an optical aimer on-axis with the system optical axis, and the aimer can be arranged to project a pattern that appears on the object surface as one of a spot adjacent to the optical axis, a line adjacent to the optical axis, and parallel, spaced apart lines on each of opposing sides of the optical axis. The aimer includes a light source that projects a structured light beam through a mirror assembly onto the system axis. The structured light beam can project a line onto the object surface oriented in a direction perpendicular to an optical axis of the first imaging system and an optical axis of the second imaging system. A measurement process, based on an image of the line acquired by the second imaging system, can then determine a height of the object surface and a distance to the object. The measurement process, based on an image acquired by the first imaging system, can also determine a length and a width of the object surface. Illustratively, the measurement process determines the length and the width based upon the distance to the object and a spacing between pixels in the image acquired by the first imaging system. Illustratively, the system can include a primary aimer assembly and a secondary aimer assembly that each project a discrete beam of structured light onto the surface in a relative relationship that indicates a focus distance with respect to the first imaging system and indicates an approximate center of the field of view of the second imaging system. The primary aimer assembly and the secondary aimer assembly can also each project a discrete beam of structured light onto the surface in a relative relationship that indicates an intersection of an optical axis of the first imaging system relative to an optical axis of the second imaging system. The primary aimer beam can reside on an optical axis of a camera optics of the camera assembly and the secondary aimer beam can be oriented at an acute angle with respect to the optical axis such that crosses the main aimer beam at a defined distance relative to a focal plane of the camera optics.

The mirror assembly can include a beam splitter that allows light to pass from the object surface to the first imaging system. More generally, the processor can be arranged to identify a location of features in an image of the second imaging system and thereby determine a distance of the vision system from the object surface containing the imaged features. A variable lens can be provided to the first optics and a control can set a focus of the variable lens based upon the distance. The variable lens can comprise a liquid lens. Illustratively, the second imaging system can define an optical axis that is tilted with respect to the system axis in a Scheimpflug configuration. The system can include a display, in which an image acquired by the first imaging system is projected on the display so as to assist in orienting the object surface with respect to the first imaging system. The display can include a graphic that represents a center thereof so that the object in the image can be aligned with the center.

In another example, a system and method for assisting a user of a handheld device employed applications requiring close focus distances (and within tight tolerances—e.g. a few millimeters) is provided. The system and method includes a combination of an on-axis aimer with a secondary guiding aimer that projects a structured beam pattern at an acute angle with respect to the on-axis aimer. This combination of aimers assists the user in positioning the reader at the proper focus distance with respect to the object and/or region of interest. The projected aimer patterns project two constructs that, when intersecting on the region, provide intuitive and clear feedback to the user in focusing the reader without (free of) the need of a mechanical stand-off.

In an illustrative embodiment, a vision system for reading features of interest within a field of view on a surface, having at least a first camera assembly that is adapted to focus on the surface, is provided. A primary aimer assembly and a secondary aimer assembly each project a discrete beam of structured light onto the surface in a relative relationship that indicates a focus distance with respect to the first camera assembly. The primary aimer beam resides on an optical axis of a camera optics of the first camera assembly and the secondary aimer beam is oriented at an acute angle with respect to the optical axis such that crosses the main aimer beam at a defined distance relative to a focal plane of the camera optics. The primary aimer beam can define a geometric pattern on the surface that approximately defines the field of view. The geometric pattern of the primary aimer beam can be a line with endpoints at approximate edges of the field of view that is projected by a laser and optics assembly. The secondary aimer beam typically crosses the primary aimer beam approximately at a center of the field of view. The primary aimer beam and the secondary aimer beam can project a combined pattern that represents a working distance range between the surface and the first camera assembly. The secondary aimer beam can define a controlled beam geometry so that the secondary aimer beam crosses the primary aimer beam along a range of distances between the surface and the first camera assembly that correspond approximately to the working distance range. The secondary aimer beam can project, onto the surface, a geometric shape with edges that align at opposing edges of the working distance range with a geometric shape projected by the primary aimer beam. Illustratively, the geometric shape projected by the secondary aimer beam defines at least one of a rectangle, a square, a regular polygon and an irregular polygon. The system can include an emitter that projects the secondary aimer beam having a variable optics assembly that variably projects the beam so as to at least one of (a) adapt to different focus distance and (b) provide further information to the user based upon of a variable pattern of the projected secondary beam on the surface. The variable optics can comprise at least one of a mechanically variable lens, liquid lens and variable LCD window. Illustratively, the primary aimer beam approximately defines a first wavelength and the secondary aimer beam approximately defines a second wavelength, visibly discrete from the first wavelength. The features of interest can define small scale ID codes, such as DPM codes.

In exemplary embodiments a second camera assembly is provided to the overall vision system, in which the camera optics of the first camera assembly is aligned on-axis and the camera optics of the second camera assembly defines a Scheimpflug relationship. Illustratively, the primary aimer beam and the secondary aimer beam are arranged to project onto the surface in a relative relationship that (a) indicates an approximate center of the field of view of the second camera assembly, and/or (b) indicates an intersection of an optical axis of the first camera assembly relative to an optical axis of the second camera assembly.

In an illustrative embodiment, a method for focusing a camera assembly for reading features on a surface using an image processor/vision system associated with the camera assembly is provided. The method includes the steps positioning the camera assembly with respect to the surface so as to align a projected shape of a primary aimer beam with respect to the features, and adjusting a distance of the camera assembly from the surface so that a projected shape of a secondary aimer beam crosses the primary aimer beam. This indicates to the user whether the camera assembly is within an acceptable working distance range to read the features. The camera assembly can be arranged variously in accordance with the above-described system.

BRIEF DESCRIPTION OF THE DRAWINGS

The invention description below refers to the accompanying drawings, of which.

DETAILED DESCRIPTION

I. System Overview

Figure 1:
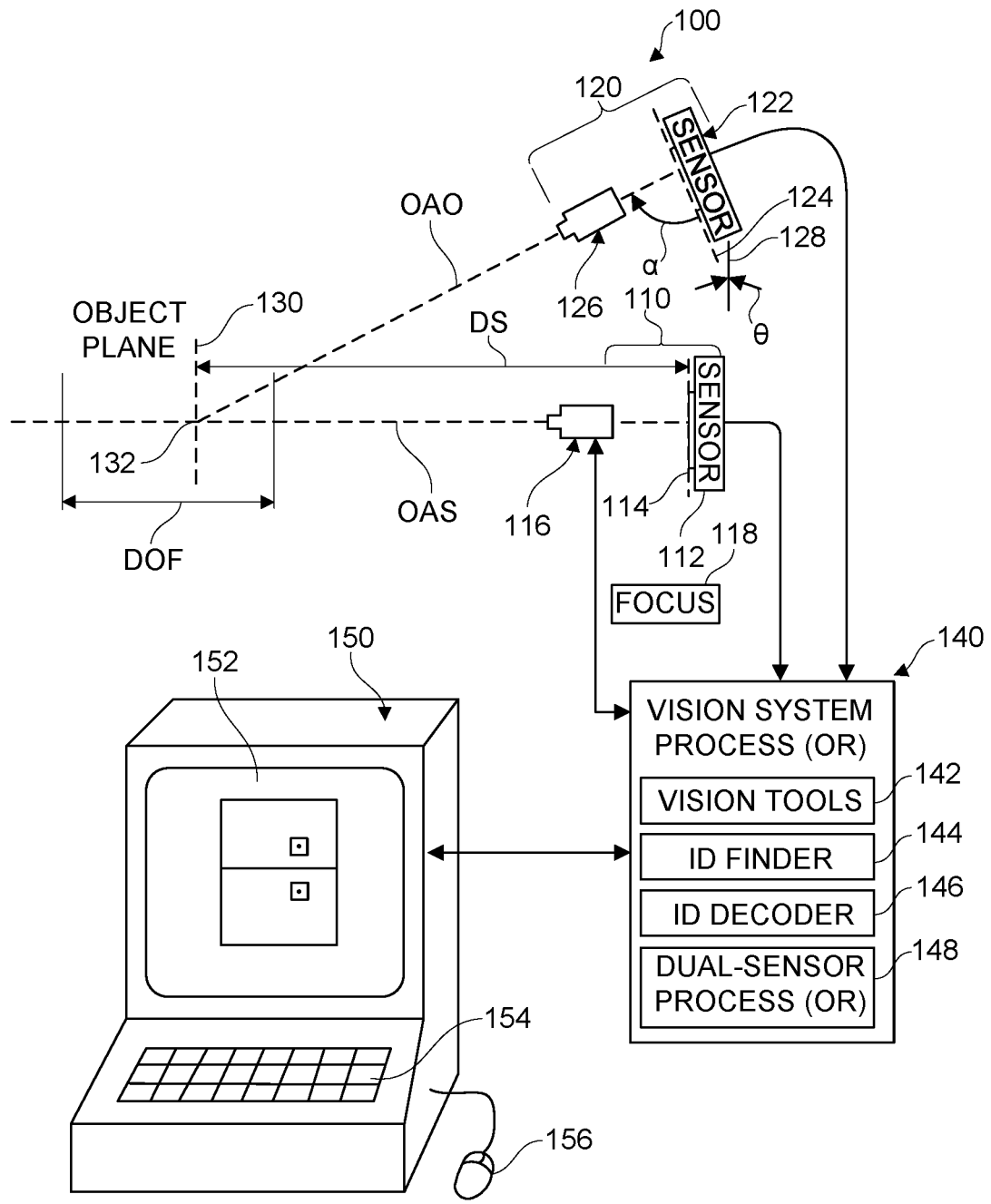
FIG. 1 is a diagram of a two-axis vision system camera arrangement for imaging larger and smaller features at longer and shorter distances in which one of the two imaging systems is arranged in an extended-depth of field/focus (e.g. tilted or Scheimpflug) configuration with respect to the other imaging system, which resides in line with the system optical axis.

FIG. 1 shows a vision system arrangement 100 for use in providing an enhanced depth of field (DOF) useful in imaging small features, such as ID codes located on imaged object surfaces. The arrangement 100 includes a first imaging system (also herein termed a "camera assembly") 110 arranged in accordance with a conventional, on-axis (straight-line) configuration with respect to the system optical axis OAS. The on-axis imaging system 110 includes an image sensor (also termed a "sensor" or "imager") 112 defining an image plane 114 and an optics package 116, that can be any appropriate fixed or removable lens arrangement. This lens arrangement 116 can include a variable focus lens (for example an electronically controlled membrane liquid lens, such as those available from Optotune of Switzerland and Varioptic of France. In such arrangements, the liquid lens can be controlled using any appropriate focus data (for example, detecting sharpness with vision tools, use of range finders, including LIDAR, time-of-flight sensors, etc.) to provide inputs 118 that direct the proper focal distance. Focus can be controlled by the generalized vision system processor 140, described below or by a separate focus processor—or a combination of operatively connected process components. In general, the lens arrangement 116 is sized and configured to image an object surface (e.g. plane) 130 at a distance/range DS from the image plane 114. Various prisms, mirrors, filters, beam splitters, etc. can also be employed, as described below.

In this manner, the conventional, on-axis imaging system 110 can operate as a standard medium and long range vision system camera arrangement, and can employ conventional or customized auto-focus functionality to allow operation within a given range. The second imaging system (camera assembly) 120 is employed for close-in imaging of small features, thereby providing a vision system camera arrangement that is capable of both longer range and close-in imaging applications.

The second imaging system 120 also includes an image sensor 122, with corresponding image plane 124, and associated lens optics 124. The sensor 122 and/or lens optics 126 can be similar in performance to the on-axis sensor 112 and/or optics 116. Optionally, it can include an auto-focus assembly as described above. The second sensor image plane 124 is arranged at an acute angle θ with respect to a vertical line 128, which is parallel to the on-axis image plane 114 (and therefore, perpendicular to the system optical axis OAS). Likewise the second sensor image plane 124 defines a non-perpendicular (acute) angle α with respect to the axis OAO defined by the second imaging system lens optics 126. The angles θ and α are selected so that the second imaging system 120 observes the Scheimpflug principle (described further below) with respect to points on the object surface 130 where the optics axis) OAO and system, optical axis OAS converge (point 132). As also described further below, the resulting vision system arrangement 100 affords a desirable depth of focus DOF when imaging small features (e.g. ID codes of 3 millimeters and smaller).

The first and second image sensors 112 and 122 (which are typically 2D grayscale or color pixel arrays but can be a 1D array in various embodiments) are each interconnected with one or more vision system processor(s) 140. The processor(s) 140 can be contained completely or partially within the housing of the vision system camera arrangement. The processor carries out various vision system processes using image data transmitted from the image sensors 112, 122. The processes/processors can include, but are not limited to vision tools 142, such as edge detectors, blob analyzers, caliper tools, pattern recognition tools, and other useful modules. The vision system processor 140 can also include an ID finder that interprets data from vision system tools and determines whether ID candidates are present in the analyzed image(s). An ID decoder 146, which can employ conventional functional modules, as well as custom processors/processes, attempts to decode found ID candidates within the image. Other processes and/or modules can also be provided, such as those that handle the image data from the two sensors 112 and 122 and provide various control functions—for example, auto-focus, illumination, image acquisition triggering, etc. Such functions should be clear to those of skill. Alternatively, some or all of the vision system processes can be contained within a general purpose computing device 150, such as a PC, server, laptop, tablet or handheld device (e.g. smartphone), which can include a display and/or touchscreen 152 and/or other forms of conventional or custom user interface, such as a keyboard 154, mouse 156, etc. It should be clear that a variety of processor arrangements and implementations can be employed to provide vision system functionality to the arrangement 100 in alternate embodiments. Similarly, where the camera arrangement is used for tasks other that ID decoding, appropriate vision system process modules can be employed—for example, where the vision system is used for inspection, a training process module and trained pattern data can be provided.

Figure 2:
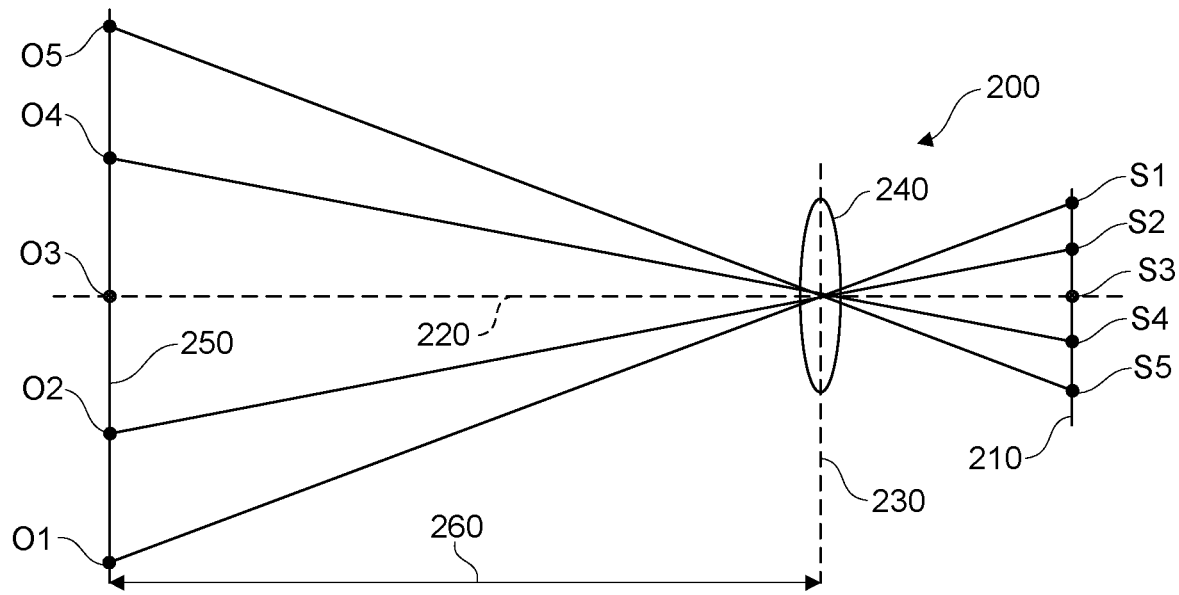
FIG. 2 is an optics diagram of the performance the on-axis imaging system employed in the two-axis, dual-imaging vision system arrangement of FIG. 1.

As described above, the two imaging systems (camera assemblies) 110 and 112 are configured to observe different optical setups, namely a conventional, on-axis configuration and a Scheimpflug configuration, respectively, when acquiring images of the same region of an object surface. Referring briefly to the diagram 200 of FIG. 2, the on-axis imaging system 110 images objects according to the depicted principles. That is, the image plane 210 of the sensor is perpendicular to the optical axis 220. The effective optical plane 230 of the lens system 240 is also generally perpendicular to the optical axis 220. The optical axis intersects the object surface 250 as shown, at a distance 260. In this arrangement, each point on the object (O1, O2, O3, O4 and O5) at the focal distance 260 is in focus at a corresponding point (S1, S2, S3, S4 and S5) on the sensor image plane 210. Points that are ahead of or behind the distance 260 may appear out of focus based on their location on the sensor image plane.

II. Two-Axis Camera Unit

Figure 3:
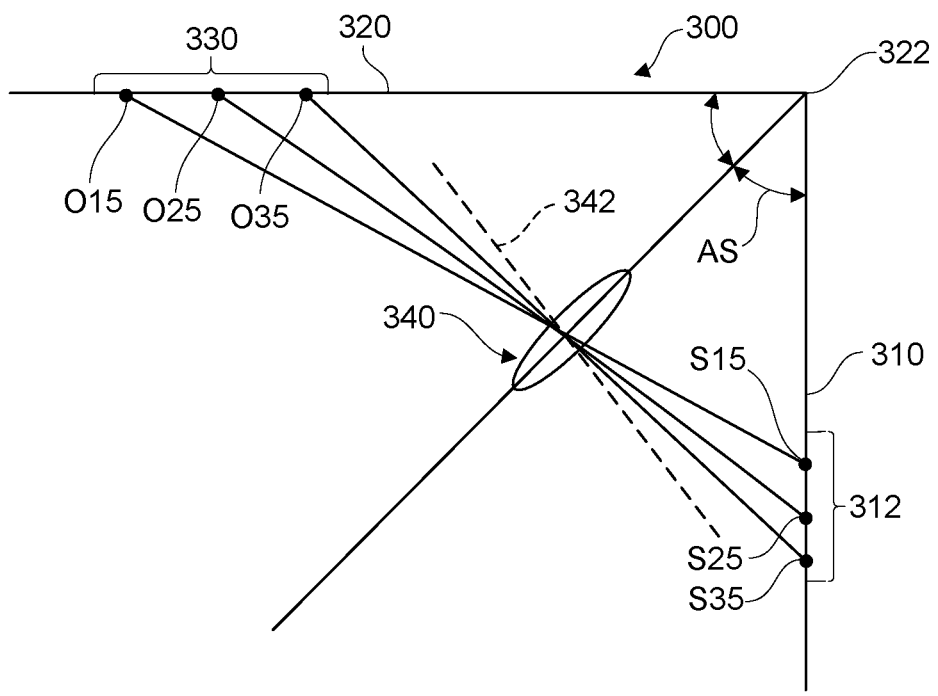
FIG. 3 is an optics diagram of the performance of the Scheimpflug imaging system employed in the two-axis, dual-imaging system arrangement of FIG. 1.

FIG. 3, shows a diagram 300 of the optical characteristics of the Scheimpflug camera assembly 120. In this arrangement the sensor image plane 310 is located in a region 312. The object surface of interest 330 resides along a line/plane 320 that intersects the sensor image plane 310 at point/line 322 at an approximate 90-degree (perpendicular) angle. The lens optics 340 defines an optical axis 342 that is perpendicular to an effective optical plane 344. According to the Scheimpflug principle, the optical plane 344 is oriented at an angle AS and position with respect to the sensor image plane 310 that causes the plane 344 to intersect the point 322 at which the sensor image plane 310 and object surface plane 320 also converge. This configuration causes each point O1S, O2S and O3S on the object 330 to appear in focus at a point S1S, S2S and S3S (respectively) along the sensor 312. It should be clear that the points on the object 330, while remaining in focus, are displaced at an offset depending upon their distance from the camera lens 340 and sensor image plane 310 in a Scheimpflug configuration, unlike an on-axis configuration, where points, despite changes in relative distance, remain centered about the system optical axis.

Figure 4:
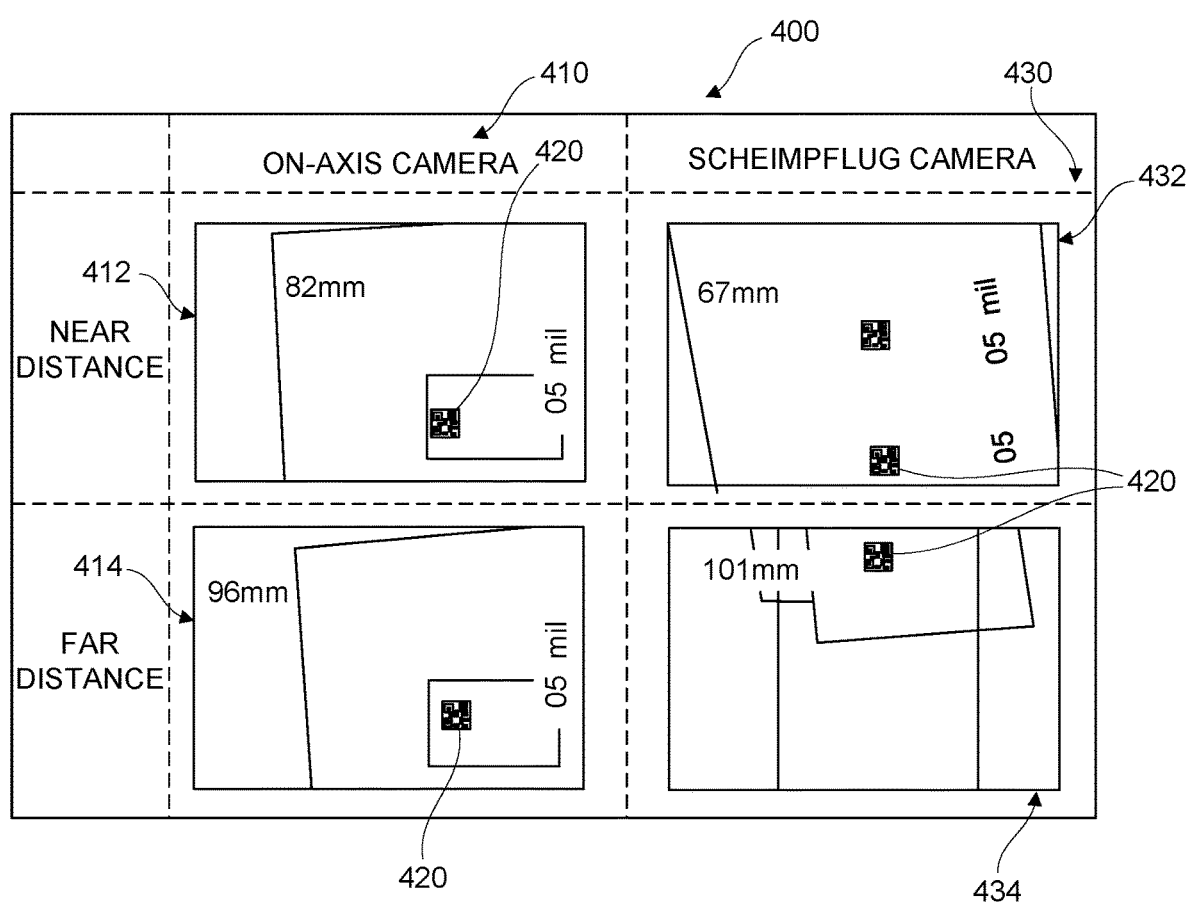
FIG. 4 is a diagram of acquired images showing a comparison between feature (e.g. ID code) location in an image acquired by the on-axis imaging system and the extended-DOF imaging system at varying distances, according to the vision system arrangement of FIG. 1.

FIG. 4 shows a diagram 400 of images acquired with each of the two imaging systems 110 and 120 in accordance with the vision system arrangement 100 of FIG. 1. In general, the above-described camera configuration is shown in actual operation, wherein the use of a second, Scheimpflug arrangement can increase the overall DOF of the system from 14 millimeters to 34 millimeters for an exemplary 5 MIL code at 85 mm distance.

The exemplary images 412 and 414 shown in the left column 410 depict an object containing an ID (e.g. a printed DataMatrix) 420 at a relative near distance (82 millimeters) and a further distance (96 millimeters), respectively. The operative DOF in this example, is approximately 14 millimeters. Note that the image appears in the approximate same location in each image 412, 414 for the on-axis camera, except relatively smaller at further distance (image 414).

The right column 430 depicts two images 432 and 434, depicting the same ID code 420 imaged from closer (image 432) and further away (image 434), respectively. In this image focus on this relatively small ID is advantageously maintained from 67 millimeters to 101 millimeters (an operative DOF of at least 34 millimeters). On potential limiting factor in this arrangement is the migration of the code features from the bottom edge of the sensor (image 432) to the top edge of the sensor (image 434). Thus, by providing a larger-dimensioned sensor (or an oblong-shaped sensor), the DOF of the Scheimpflug imaging system can be increased further.

Figure 5:
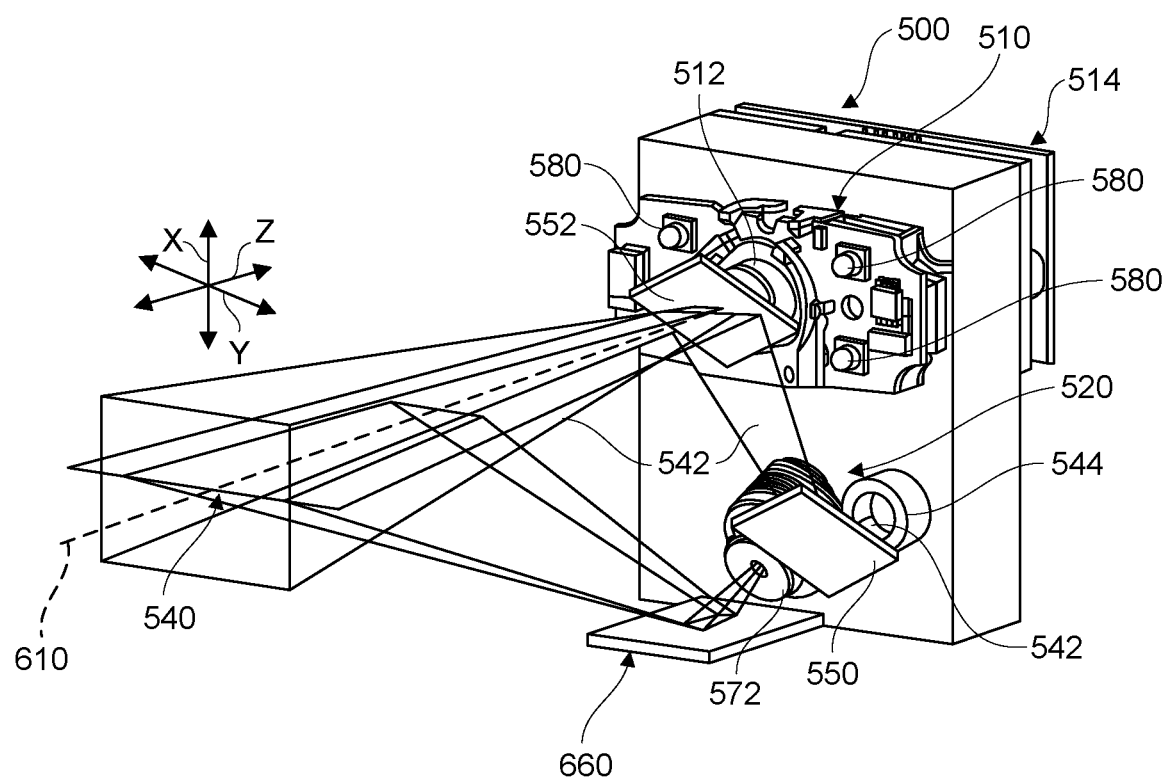
FIG. 5 is a more detailed perspective view of the camera unit for a two-axis, dual-imaging system arrangement, including a structured-light, line-illuminator and associated beam splitting assembly, according to the embodiment of FIG. 1.
Figure 6:
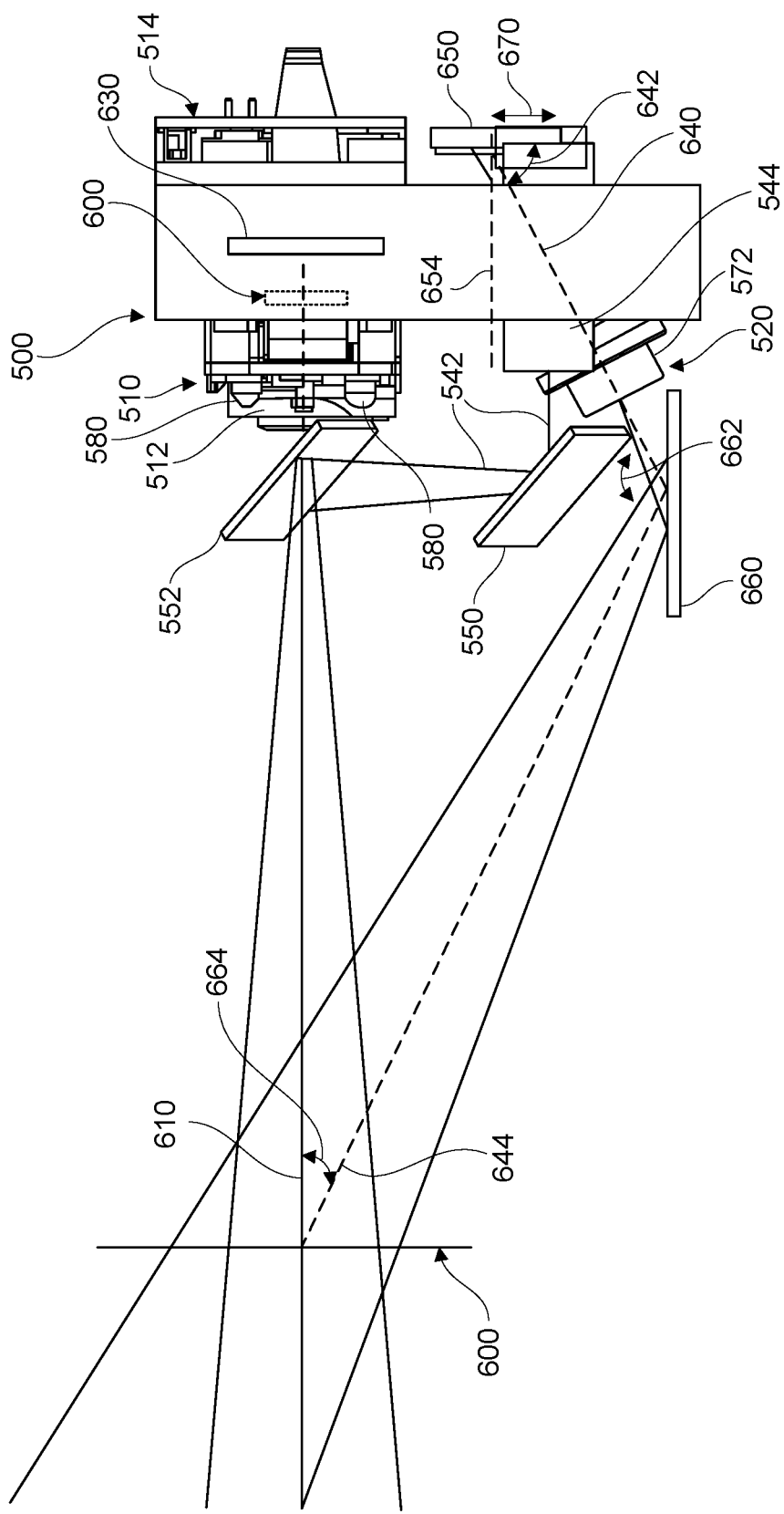
FIG. 6 is a side view of the camera unit of FIG. 5.

FIGS. 5 and 6 depict the imaging unit 500 of an overall exemplary vision system camera arrangement for use in imaging both larger and smaller features (for example, ID codes) that exhibits extended range. This unit can be part of a camera housing, such as a fixed-mount or handheld unit—for example, that shown and described in commonly-assigned U.S. Published Patent Application No. US20150178538A1, filed Dec. 20, 2013, and entitled IMAGE MODULE INCLUDING MOUNTING AND DECODER FOR MOBILE DEVICES, the teachings of which are incorporated by reference as useful background information. While not shown, the imaging unit 500 can include various housings, covers, and/or transparent/translucent window(s) that separate the camera optics and electronic components from the environment. In accordance with the above described configuration of FIG. 1, the unit 500 includes a standard, on-axis imaging system 510 and an extended DOF imaging system (e.g. operating on the Scheimpflug principle) 520. The on-axis imaging system's optical axis 610 (FIG. 6) effectively defines the full system's overall optical axis. This on-axis imaging system 510 operates to image features located at medium and large distances (relatively) and/or medium and large feature sets (e.g. ID codes). As described above, the optics 512 of the on-axis system 510 can include a variable lens 600 (shown in phantom in FIG. 6), that can be, for example a liquid lens, which is controlled by the circuitry 514 associated with the unit 500. Notably, the imaging unit 500 can include an aiming system that, in this embodiment, projects a line 540 that is defined by a transmitted, substantially planar fan of light 542 emanating from a light source/emitter 544. The fan 542 and resulting line 540 intersects/resides along the system optical axis 610. The light source 514 can be a laser diode or other component capable of generating a collimated beam over the working distance. The projected shape of the aiming system can be structured to define any desired pattern on the surface, using appropriate lenses, prisms, diffusers, and/or other optical components that should be clear to those of skill (e.g. a linear diffuser, Field lens, etc.). The fan (or other structured-illumination shape) 542 is redirected from the light source 544, which resides below and aside the system optical axis 610, onto the system optical axis by a pair of mirrors 550 and 552. The mirrors 550 and 552 are tilted in two axes (e.g. about the x and y axes as shown) to place the projected aimer light fan 542 along the system optical axis 610. The mirror 552 is located in front of the on-axis imaging system 510 and associated optics 512. This mirror 552 acts as a beam splitter, allowing returned light from the object plane (600 in FIG. 6) to pass back through the mirror 552 and enter the on-axis optics 512 and the system's first image sensor 630 (with the axis 640 perpendicular to the sensor's image plane.

The extended-DOF imaging system 520 is shown tilted to achieve a (e.g. Scheimpflug) configuration. This allows the imaging system 520 to achieve the desired extension of the focused range, which is used to image at shorter distances and/or for small codes. The extended-DOF imaging system 520 also includes appropriate optics 572, that can be fixed or variable (manually or electronically controlled). Referring particularly to FIG. 6, the optics 572 define an optical axis 640 that is oriented at a non-perpendicular, acute angle 642 with respect to the image plane of the system's second image sensor 650. In this embodiment, the image plane of the first sensor 630 and the image plane of the second senor 650 are parallel, and their respective optical axes 610 and 654 are parallel (and located remote from each other in an under-over relationship, as shown). In this exemplary embodiment, the optics 572 are directed downwardly (as depicted) into a mirror 660, that redirects the optical axis 644 upwardly at a relative angle 662 into a convergence with the system optical axis 610 in the region of the object plane 600. The use of an angled optics 572 and mirror 660 generates the extended-DOF configuration (e.g. Scheimpflug), for use in imaging small features (e.g. IDs) and/or at short distances. By way of non-limiting example, the angle 442 between the sensor image plane and optics optical axis can be approximately 120-130 degrees and the angle 662 defined by the mirror between optical axis segments 640 and 644 can be approximately 60-70 degrees. Similarly the angle 664 between the system optical axis 610 and extended-DOF system optical axis is between 60 and 70 degrees. The DOF measurement is typically defined by the sensor size, and thus it can be configured in such a way that the larger sensor dimension is used to further extend the DOF—for example, by varying the size of the second image sensor 650 along the direction of the vertical double-arrow 670. As described above, and as clear from the diagram in FIG. 6, depending upon the distance of the object surface/features to the unit 500, the features of interest (e.g. ID) will appear in different positions along the vertical axis (double arrow 670) of the second image sensor 650. Note that a set of LEDs or similar illumination elements 580 are mounted on the circuit board of the on-axis imaging system (surrounding its optical axis). This is exemplary of a variety of assemblies that can provide illumination to the imaged scene.

III. Operational Procedure

Figure 7:
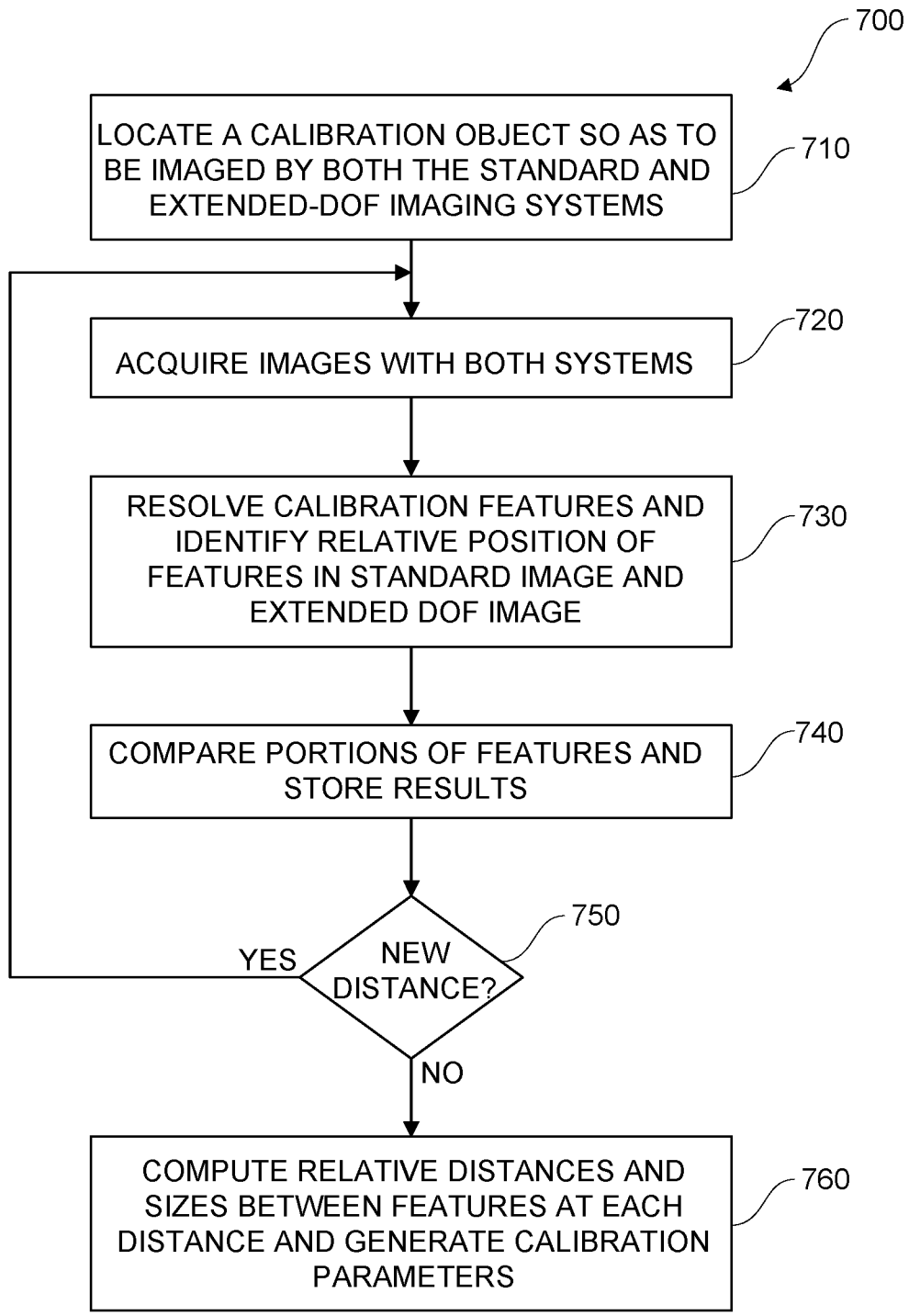
FIG. 7 is a flow diagram of an exemplary calibration procedure in which the relative position of features in the two images are compared and used generate calibration parameters for use in runtime operations.
Figure 8:
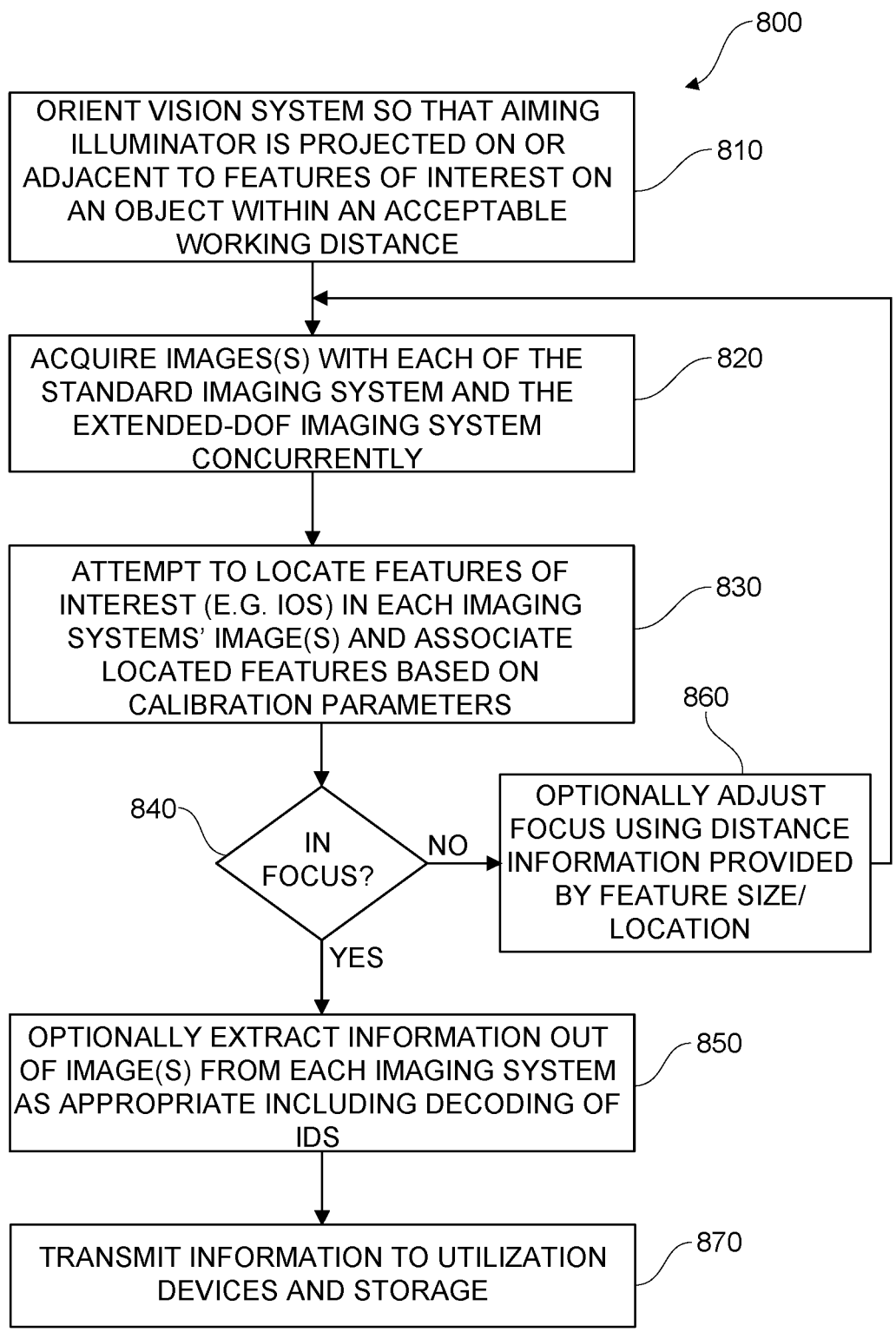
FIG. 8 is a flow diagram of an exemplary runtime procedure in which an object surface containing feature sets (e.g. ID code(s)) is imaged, and the feature information is decoded and/or used to determine size, focus and/or other characteristics based upon the calibration parameters derived in the procedure of FIG. 7.

Reference is made to the flow diagram of FIGS. 7 and 8, which respectively show procedures 700 and 800 for setting calibration between the two imaging systems within the using the calibration to determine size and location of features of interest (IDs) in a runtime operation. In FIG. 7, the procedure 700 begins in step 710 with the positioning of an appropriate calibration object at a first working distance from the imaging system(s) so that both the standard, on-axis imaging system and the extended-DOF imaging system can acquire images of the same feature set—for example checkerboards, IDs and/or or other calibration fiducials. Images are the acquired by each imaging system in step 720. Then, in step 730, the calibration features are resolved and identified—for example by decoding embedded IDs in the image that indicate the relative location of adjacent features in the overall calibration object image. With knowledge of the location of the same features in each image, the system can compare the relative locations and establish a stored mapping between images in each imaging system. Steps 720, 730 and 740 can be repeated at different working distances (decision step 750) until sufficient calibration data is acquired. Then, in step 760, the mappings of features in each image at differing working distances can be used to compute generalized calibration parameters that are used in runtime to correlate the positions of identified features in each image and other functions, such as setting the focus of the on-axis optics.

FIG. 8 shows a procedure 800 for runtime operation of the two-axis vision system according to an exemplary embodiment. In step 810, the user or an automated process (e.g. a robot manipulator, conveyor, etc. moves the object, the vision system or both into an orientation so that the standard (on-axis) and extended-DOF (Scheimpflug) imaging systems each view features of interest (e.g. ID codes) on the object surface at a distance that is within the working range for both imaging systems. This step can include projecting the structured-light aiming illuminator on or near those features. Note that the aimer can be based on a structured light beam (coherent/laser or another collimated source) that projects a pattern onto the object surface in the region of the optical axis of the standard imaging system. Based on the Scheimpflug configuration, the object is generally in focus if it is close to the horizontal plane containing the optical axis. By way of example, some exemplary aimer pattern shapes can include (but are not limited to) a laser beam (spot) coincident with the optical axis, a laser fan (line) coincident with the horizontal plane containing the optical axis, and two (e.g.) parallel, spaced-apart lines, in which one resides above and one below the horizontal plane containing the optical axis. If the object/region of interest resides between the two lines, its resulting image on the Scheimpflug configuration's image sensor is in-focus.

Basic autofocus of the on-axis imaging system optics can optionally occur using feedback a variety of mechanisms—such as time of flight sensors, etc. Alternatively, or additionally, focus can be adjusted directly based on the features in the images as described below. Next, in step 820, the standard and extended-DOF imaging systems are each activated to acquire image(s) of the features of interest. In step 830, the vision system process(or) attempts to locate and identify the features from each imaging system using appropriate vision system tools (edge finders, ID finders, etc.). Note that only one of the two imaging systems may identify readable features, based on range, etc. and if this is acceptable to extract information from the features—for example decoding of IDs—then the procedure can simply deliver the decoded information and indicate a successful read. This is advantageous when features are too far away for the extended-DOF imaging system or too close/small for the standard imaging system, such that only one of the two systems can read such features.

To the extent features are identified in both imaging systems, the calibration parameters can allow their position in each image to be associated. By way of example, if ID code features are found in the standard image, the center can be identified and assigned an (x, y) position in the field of view. The same ID code features within the extended-DOF image are also centered and assigned an (x, y) position in that field of view. Since the features in the extended-DOF image move across the field of view based on distance while the features in the standard image remain relatively stationary regardless of distance, which can allow the relative distance between the vision system and the object surface to be determined. This can be accomplished by using the calibration parameters, which map the movement of features across the extended-DOF field of view at different working distances. The size of the features (ID code) can also be determined by determining how much of the field of view it/they cover in the standard and extended-DOF image. If the current focus in the standard imaging systems optics is set (via the variable optics/liquid lens assembly) to the correct distance, based on the determined distance in step 830, (decision step 840), then the acquired images can be used for further operations, such as ID-decoding in step 850. If the set focus distance within the standard optics system does not match the current reading from step 830, then the focus can be adjusted in step 860 and images can be reacquired (steps 820 and 830). When information is extracted from the in-focus and identified features (step 850) it can be stored and/or transmitted to a downstream device—for example a logistics computing system/database, conveyor control system, etc.

IV. Integrated Display

Figure 9:
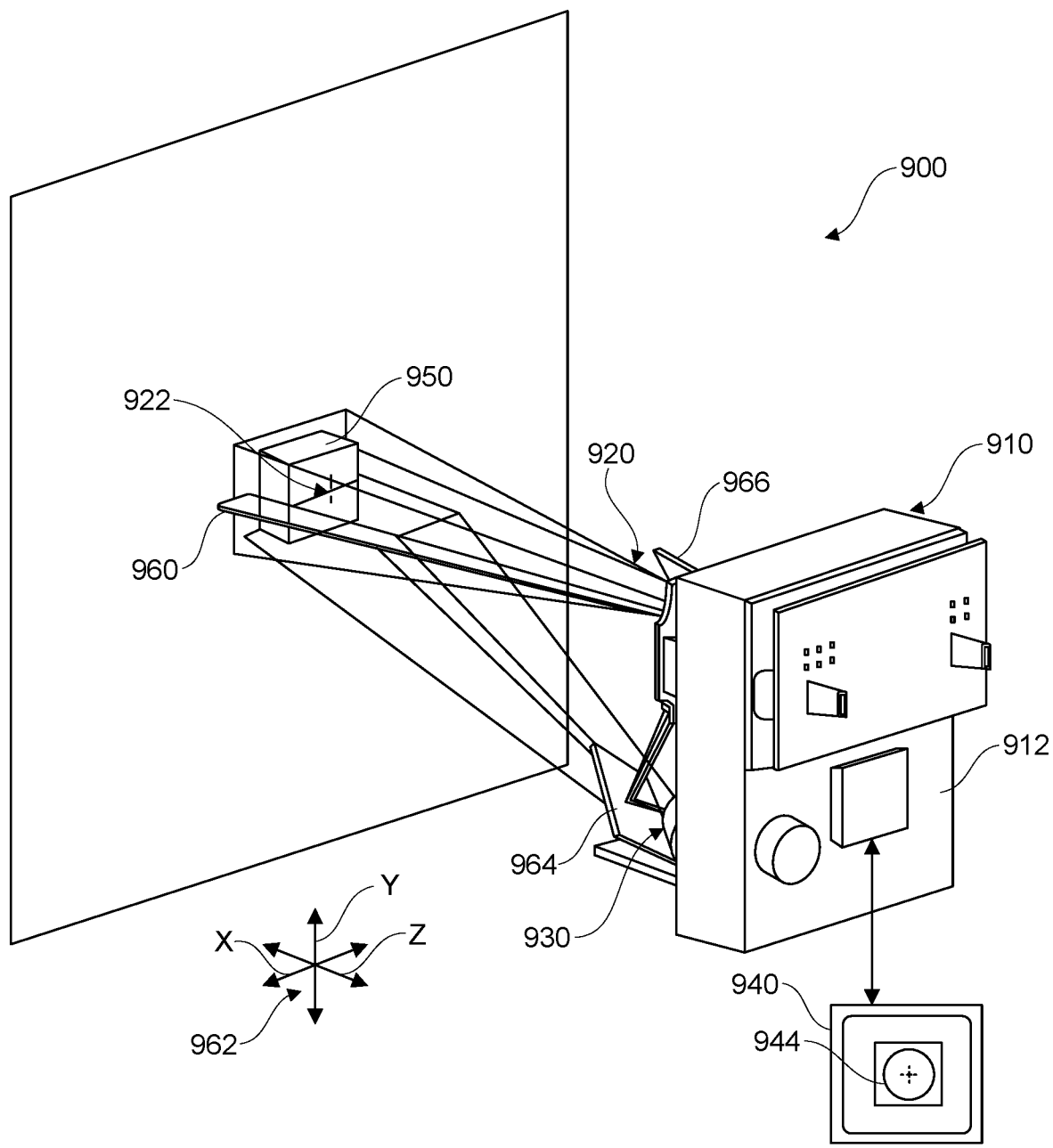
FIG. 9 is a diagram of a vision system camera arrangement and/or use(s) thereof, according to a further embodiment.

FIG. 9 shows a vision system camera arrangement 900, and/or use(s) thereof, according to a further embodiment. In this arrangement, which can be similar or identical to that of the embodiment of FIGS. 5-6 above, the overall vision system camera assembly 910 again includes two camera sensor assemblies and associated optics (termed, "cameras" 920 and 930 in this embodiment), as described generally above. The first camera 920 is shown on a local display 940 that can be part of the housing 912 of the overall assembly, or linked to a remote viewer, such as a handheld smart phone (using an appropriate wired or wireless data link). This display 940 is used as a viewfinder to manually orient the camera assembly and/or object in the (vertical) center 922 of the image (i.e. on the optical axis). In this case the viewfinder/display performs the same function as the laser aimer. As such an aimer can be omitted or selectively deactivated in this embodiment. The display can include a circle, crosshair, box or other overlaid graphic 942 that is generated as part of the display pixels or applied physically to the display screen, and serves to further assist centering of the object with respect to the image. Note that the second camera 930 is arranged in a Scheimpflug configuration, as described above, so as to provide an extended-DOF.

Advantageously, such a configuration 900 can also be used to measure the dimension of small box-shaped objects (e.g. part/object 950). An example of such a box-shaped object is a component on a printed circuit board. In this embodiment, the projected (structured light) laser fan/line 960 (as described above) is aimed on the part/region 950 that the user desires to measure. An angled mirror 964 and beam splitter 966 are used to direct the beam 960 as described above. The second (Scheimpflug) camera 930 concurrently measures the height of the part (Z dimension of axes 962), and the distance from the first (conventional) camera 920 to the part 950 by the position and shape of the image of the laser line 960 in its image (laser profiling). This height-measurement function, using the displacement of the line by the elevated object surface, occurs similarly to the operation of a laser displacement sensor, known to those of skill. The first camera 920 can measure the X and Y dimensions (axes 962) of the part by measuring the dimensions in pixels in the image and combining that value with the distance between the object and camera image plane measured by the second (Scheimpflug) camera 930, which thereby provides a scale for the pixel-to-pixel measurement.

V. Dual Aimer Arrangement

Figure 10:
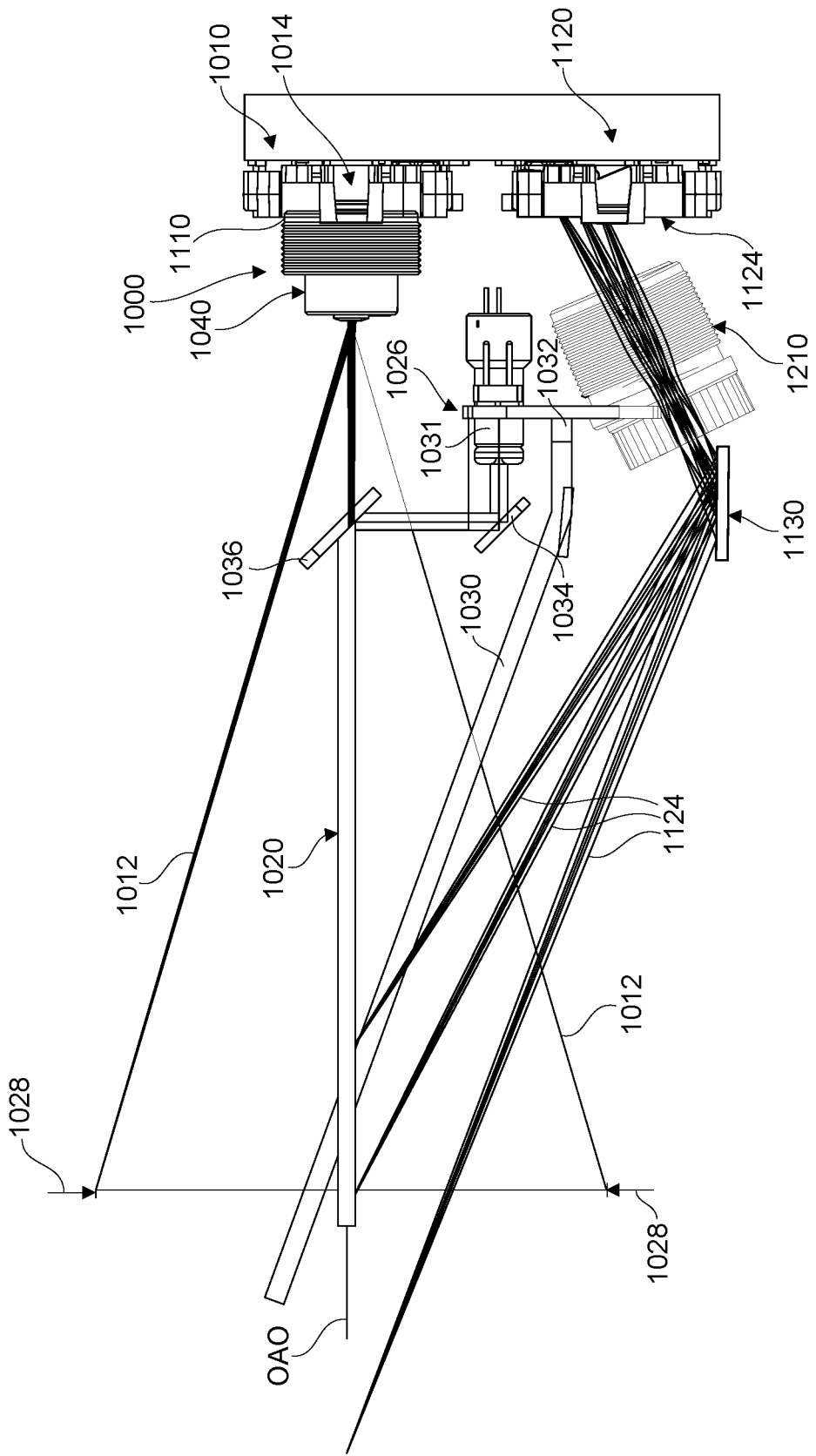
FIG. 10 is a partial side view of a two-axis vision system camera unit, showing the upper and lower imaging modules thereof, and an associated aimer arrangement adapted to assist the user in focusing at short distances and a small working ranges.
Figure 11:
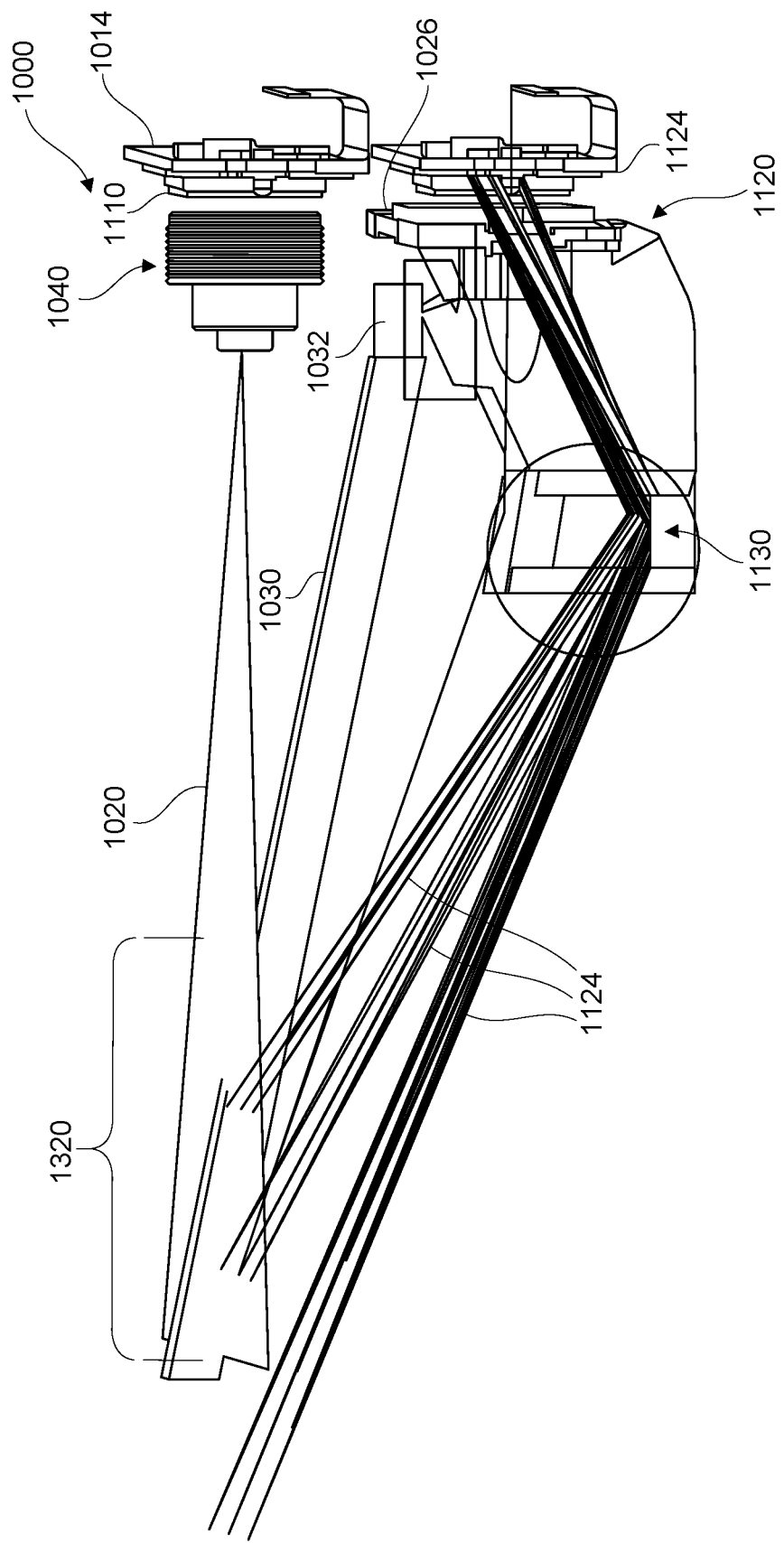
FIG. 11 is an exposed partial side view of the two-axis camera unit of FIG. 10 showing the optical path of each camera and the beams of the aimer arrangement.

FIGS. 10-14 variously show a dual-axis camera unit 1000 according to an exemplary implementation/embodiment, in which a dual aimer arrangement is provided to assist the user in focusing upon regions of interests (e.g. ID codes) at short working distances—for example approximately 1-2 inches (2-5 centimeters)—and short working ranges (e.g. a few millimeters). In FIG. 10, the general function and placement of the aimer assembly is shown with respect to the upper (on-axis) camera module 1010 and lower camera module 1120 (similar in structure and function to the imaging system/unit 510) described above. The sensor 1014 of the upper module 1010 images along the axis OAO as shown by the ray lines 1012, providing received light from the scene, within the field of view 1028, to a circuit assembly 1014, which includes a (e.g.) 2D image sensor 1110 (FIG. 11). The system's focal plane can coincide with the sensor 1110. A circuit board 1026 includes a (e.g.) laser light emitter 1031 that works in conjunction with associated optics (e.g. 45-degree mirror 1034 and dichroic mirror 1036—also described above) to project a horizontal fan of light 1020 in a predetermined (typically) visible color, such as red, along the axis OAO. Notably, the mirrors 1034 and 1036 allow the primary aimer beam (1020) emitter 1031 to be located remote from the optical axis OAO, and direct the beam onto the axis OAO, while enabling received light to travel back from the scene through the (e.g. dichroic) mirror 1036.

A secondary aimer beam 1030 is projected at a relative acute angle AA with respect to the on-axis (primary) aimer beam 1020. The beam 1030 is projected from a projection assembly 1032 positioned on the circuit board 1026. This board 1026 is shown residing near the lower module's (1120) optics 1210 (and beneath the upper module's (1010) optics 1040. In this example, the secondary aimer's emitter assembly 1032 is located in a convenient position below the primary aimer's (horizontal fan) emitter 1031 and above the lower module optics 1210. This emitter assembly 1032 can include appropriate optics (e.g. mirrors, tilted mountings, etc.) to enable the beam 1030 to assume the angle AA.

In an embodiment, the secondary aimer beam 1030 defines a wavelength (e.g. green) that is discrete from the fan/line aimer beam 1020. This allows the patterns of the two projected beams 1020, 1030 to be differentiated more readily by a user. Other discrete colors can be employed in alternate examples, and/or non-visible wavelengths can be employed in certain embodiments where appropriate—for example in use on luminescent surfaces. In an embodiment, the angle AA defined between the beams 1020 and 1030 is approximately 15 degrees and variable through a range of angles (e.g. approximately 10-20 degrees) depending upon the desired working distance.

Figure 12:
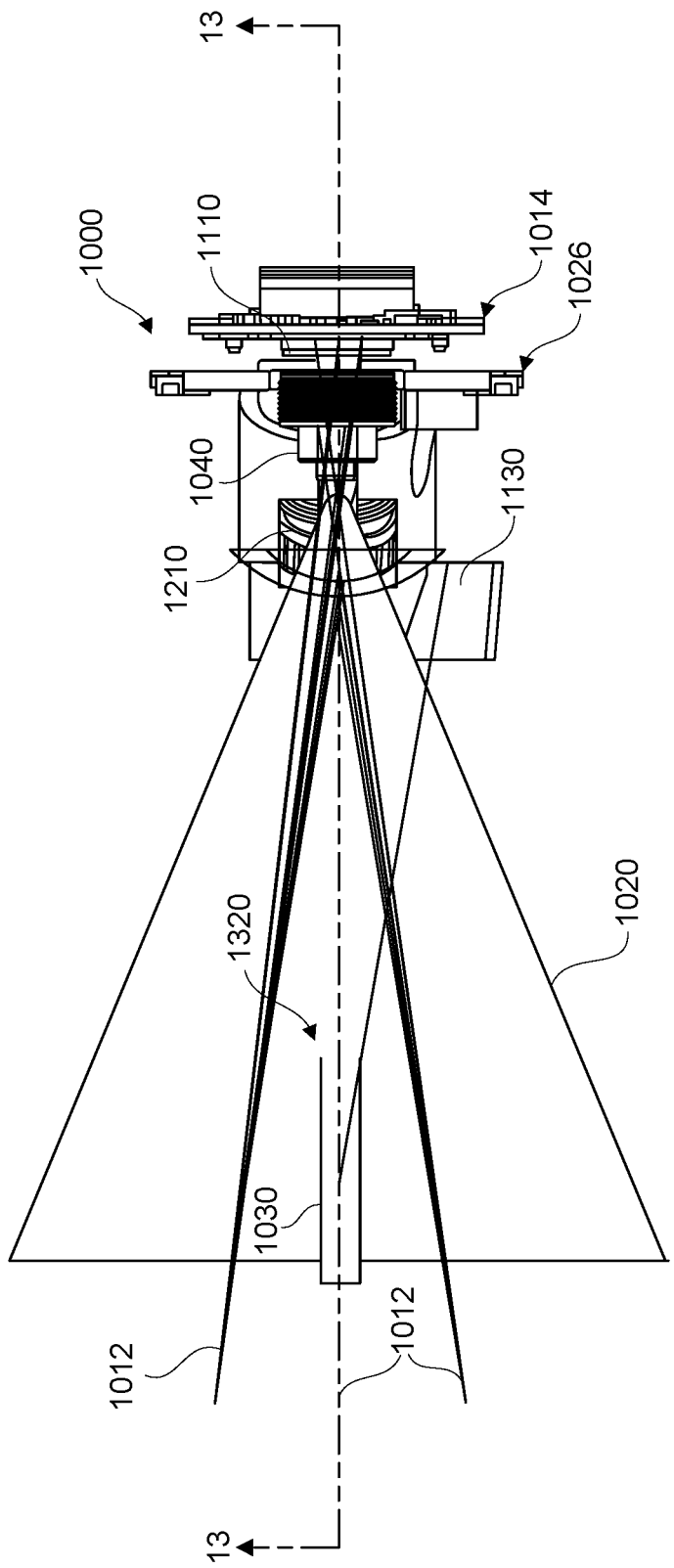
FIG. 12 is a top view of the camera unit and aimer beams of FIG. 10.
Figure 13:
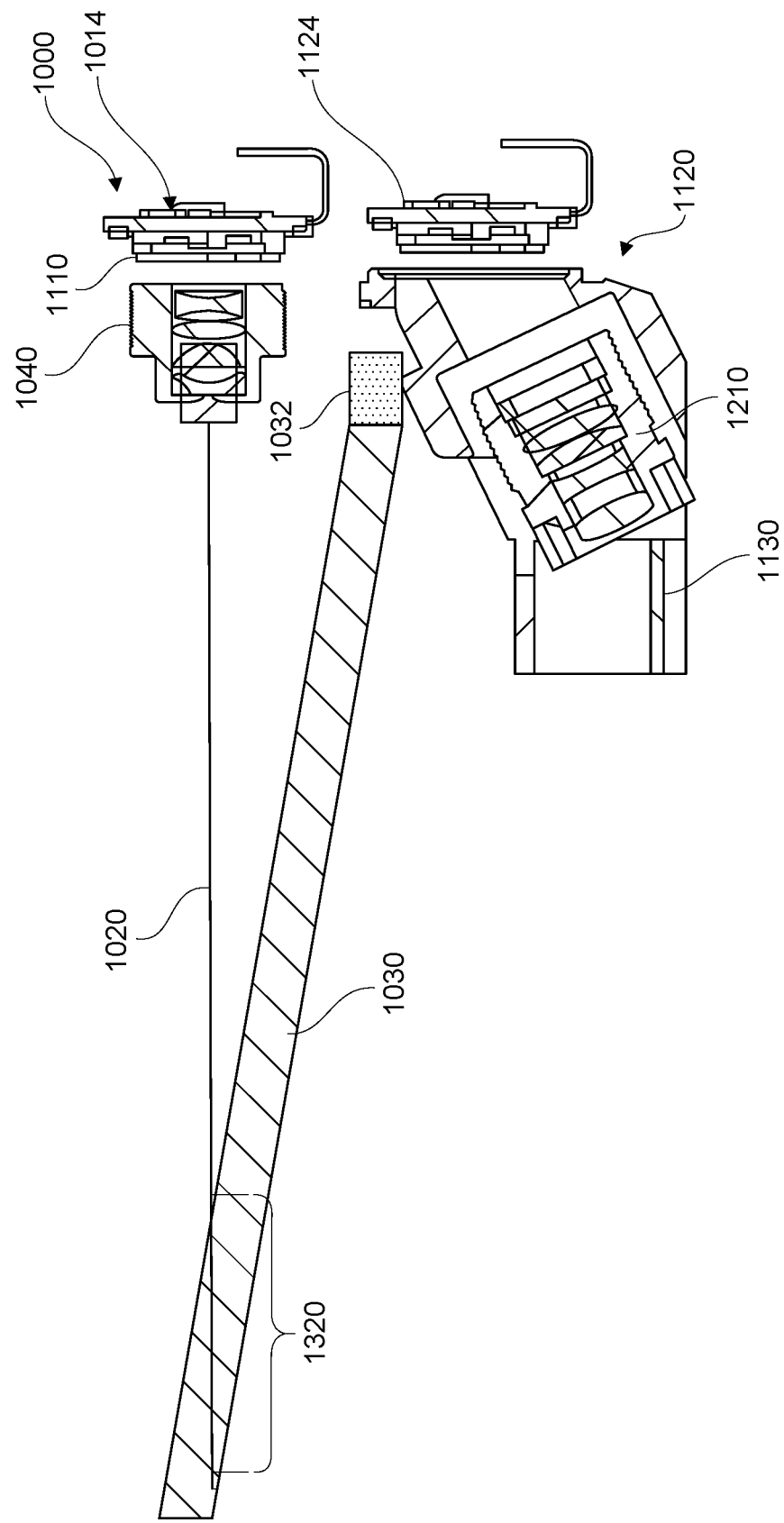
FIG. 13 is a side cross section of the camera unit and aimer beams taken along line 13-13 of FIG. 12.

With further reference to FIGS. 11-13, the overall dual-camera arrangement 1000 is shown, including the lower camera module 1120 and associated sensor circuit board 1124. The lower module 1120 is similar in structure and function to the unit 520 described above. It receives light from the scene (rays 1024) via an angled optics 1210 and (FIGS. 12 and 13) and mirror assembly using the Scheimpflug principle, as described above. Note that the structural arrangement of components in this example can be varied widely while employing the two-aimer assembly contemplated herein. Hence the depicted arrangement in FIGS. 10-14 is by way of example.

Figure 14:
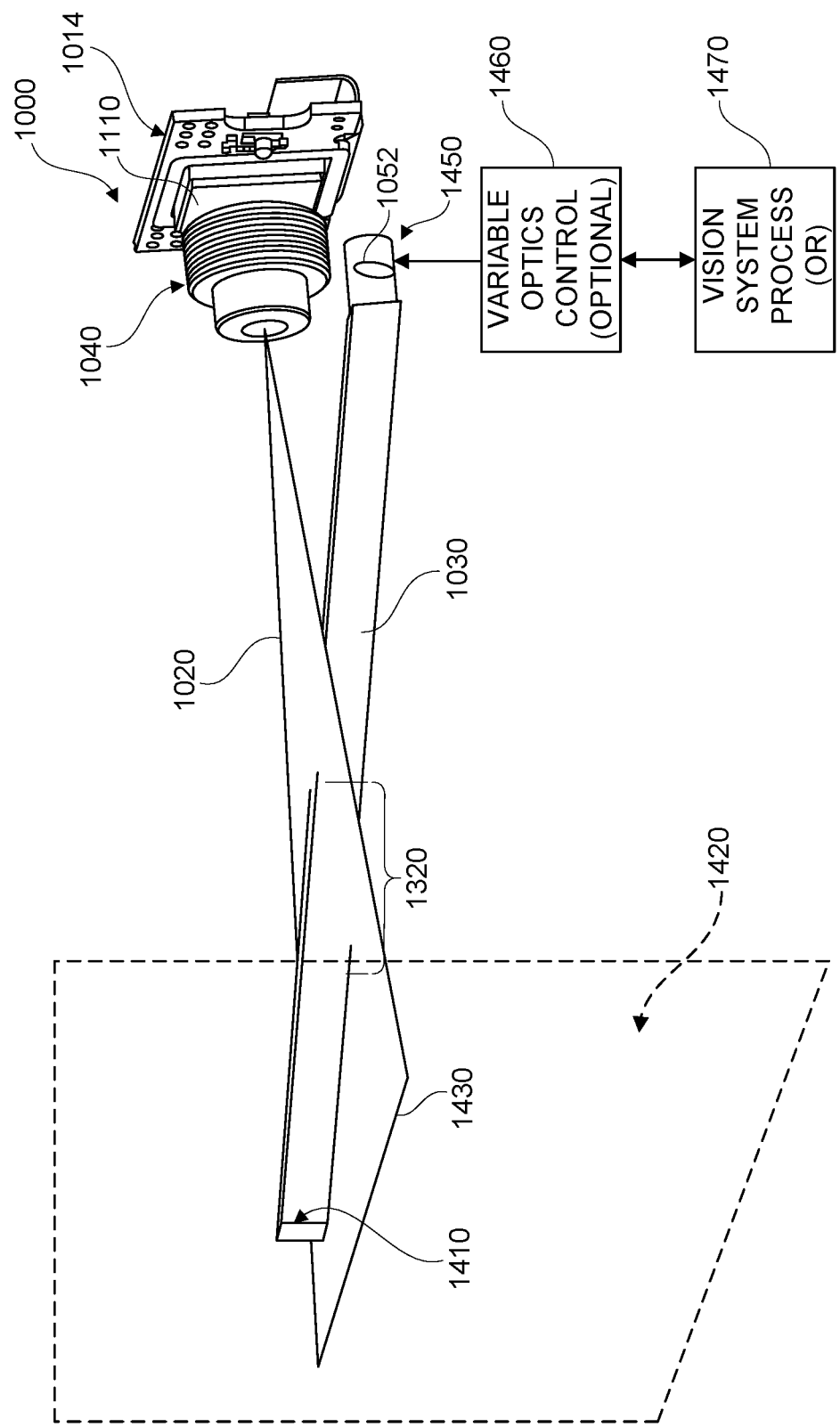
FIG. 14 is a partial perspective view of the on-axis/upper camera module of the camera unit of FIG. 10 showing the aimer arrangement.

The emitter assembly 1032 is constructed and arranged to project a structured light pattern—for example a rectangle, onto the region of interest. Appropriate lenses and filters, which should be clear to those of skill, are used to generate the desired pattern. This projected pattern shape (or another appropriate regular or irregular polygonal/curvilinear shape) allows the user to ascertain relative position and orientation. For example, when the shape is skewed, it can indicate that the reader axis OAO is not oriented perpendicularly to the plane of the read surface. Likewise, as described below, the boundaries of the projected shape of the secondary aimer beam can indicate the working range of the device—with the top edge being one end of the range and the bottom edge being the opposing portion of the range. As shown in FIG. 14, the shape 1410 of the secondary aimer beam 1030 projected upon an exemplary read surface 1420 (shown in phantom) is a square or rectangle. This contrasts to the projected horizontal line 1430 of the on-axis, fan-shaped beam 1020.

As shown, the secondary aimer beam 1030 is arranged to cross the on-axis aimer beam (depicted as a fan-shaped plane) 1020 at a beam crossing area 1320. The crossing area defines a length along the axis OAO that is the working range for proper focus of the reader. Note that the secondary aimer pattern is for use at close distances. For longer distances, the secondary aimer pattern may be sufficiently remote from the primary aimer line to be unnoticeable by the user. In such instances, the line of the primary aimer is used exclusively to orient the reader with respect to the region of interest and sufficient working range is provided by the camera unit to ensure a good ID read.

Notably, the illustrative dual aimer arrangement provides significant assistance in achieving a proper focus distance for the upper (on-axis) camera module 1010. For the lower (Scheimpflug) camera module 1120, the dual aimer arrangement also helps the user to determine the associated field of view for the camera assembly 1000. As described above, the full length of the axis OAO remains in focus for the lower module 1120, but only a portion of the scene along the axis is imaged onto its sensor. Hence, determining the bounds of the field of view is desirable to ensure the features are fully imaged during reading.

Figure 15:
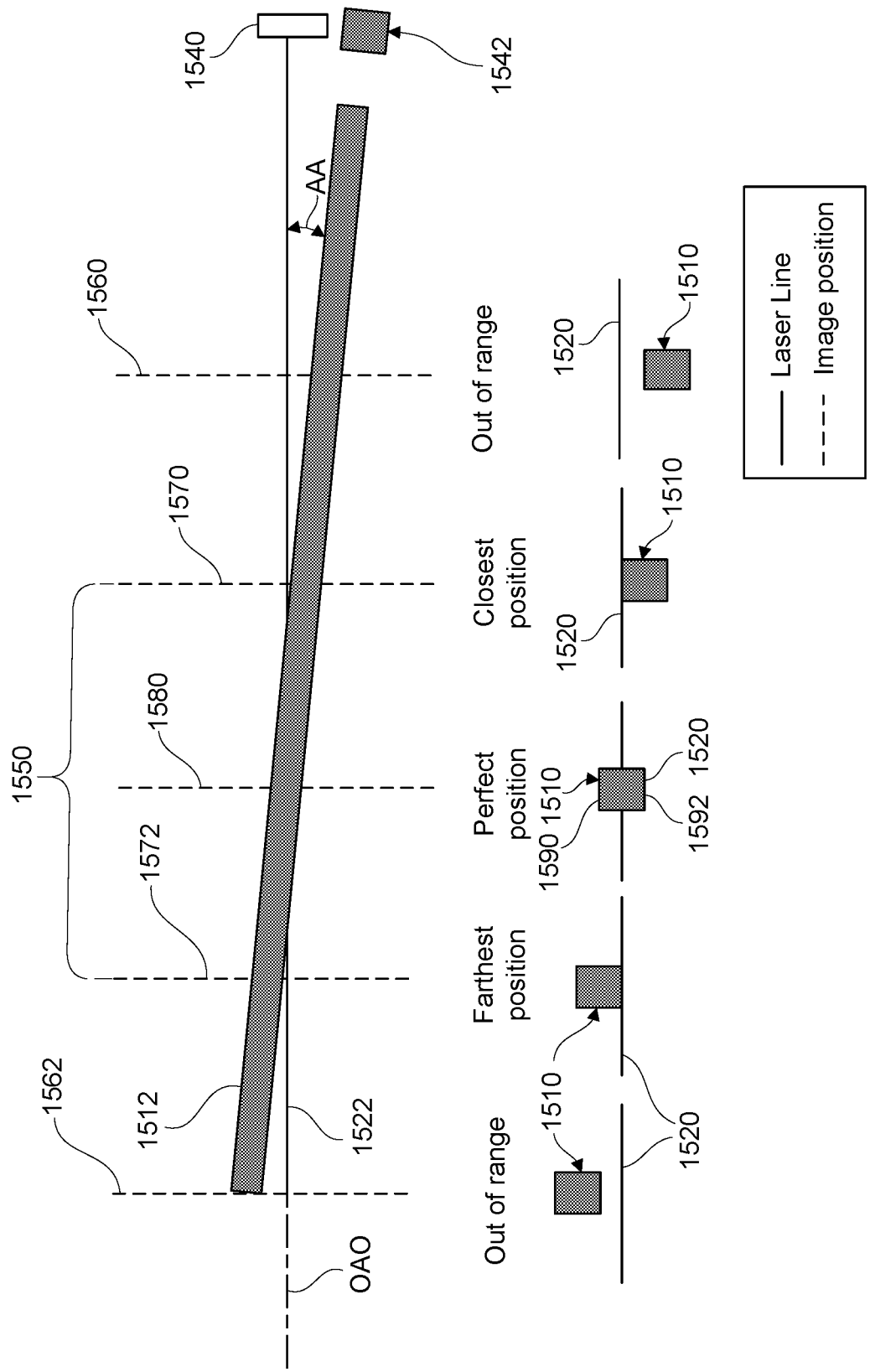
FIG. 15 is a diagram showing the working distance range for the camera unit's short-range module and associated aimer pattern relationship(s).

Reference is made to the diagram of FIG. 15, which shows the relative placement of the secondary aimer pattern (square 1510) versus the primary aimer line 1520 along the working range 1530 of the camera unit 1540. As described above, the crossing area 1550 between the secondary aimer beam 1512 and on-axis aimer beam/fan 1512 is determined by the relative angle AA and position in the camera unit of the emitter 1542 with respect to the axis OAO. When the surface of interest is positioned out of range (vertical dashed lines 1560 and 1562), the pattern 1510 is remote from the line 1520, appearing either below (too close) or above (too far) from the line. At the closest and furthest edges of the working range 1550 (vertical dashed lines 1570 and 1572), the pattern 1510 upper or lower edge (respectively) barely touches the line 1520. In the middle of the range 1550 (vertical dashed line 1580), the pattern is centered with respect to the line, with its upper and lower edges 1590, 1592 approximately equidistant therefrom. This is the optimal/perfect position for obtaining a good, in focus ID code read.

Note that the primary aimer beam can define alternate shapes and elements, in addition to the depicted line. For example, it can define a pair of aimer dots or another convenient pattern (e.g. circle, oval, crosses, etc.). Also, the primary aimer can define a width that corresponds to the (widthwise) field of view at the focus distance chosen by the user. In this manner, the user can determine if the selected features on the surface are within the field of view. In the illustrative example, the optical axis OAO is within the center of the camera unit's field of view (1028) and, thus, the secondary aimer beam crosses the primary aimer beam approximately at the center of the field of view. The secondary aimer(s) can likewise define various patterns, in addition to the above-described line-crossing pattern at the optimal focus distance. For example, in alternate implementations the secondary aimer can cross the primary aimer line/pattern at a certain distance from the center of the field of view. This configuration can be used to allow the reader to be focused at a certain distance for applications like gap measurement. In another implementation, the secondary aimer can define an extended pattern such that two or more distances, or a range of distances, can be defined. This pattern can be for example two or more dots, or a vertical line, respectively, and can project a form of ranging "reticle" on the surface of interest.

In another implementation, shown by way of example in FIG. 14, the emitter 1450 of the secondary aimer beam 1030 is modified to include variable optics—for example a liquid lens, a mechanically variable-focus lens and/or an LCD window that varies the pattern 1052. This variable optics mechanism is controlled by an appropriate controller circuit 1460, which is part of, or connected to, the camera unit's vision system processor 1470. This process(or) 1470 can be similar in structure and/or function to the process(or) 140 described above. The variable pattern/focus can provide the user with differing focus distances and/or provide further information that is useful in positioning and focusing the reader.

VI. Conclusion

It should be clear that the above-described two-axis, dual imaging system arrangement provides an effective mechanism for reading features, such as IDs, at varying distances and using information obtained from the images acquired by the dual image sensors to perform a variety of useful tasks. These tasks can include autofocus, feature size determination and general distance measurement. The arrangement can incorporate aimers and other desirable features and can be employed in both handheld and fixed mount units. The system can also provide an effective mechanism to enable users to focus in a small working range, and determine associated field of view, by providing two aimer beams that cross when appropriate focus is achieved.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Alternatively, the vision system arrangement can include a single sensor that is divided into at least two separate regions, each receiving images from discrete camera arrangements (i.e. on-axis and Scheimpflug), using various optic mechanisms (e.g. prisms, mirrors, etc., configured in a manner that should clear to those of skill) to guide received light to the appropriate location on the sensor. Also, while the exemplary extended-DOF imaging system and viewfinder arrangement shown and described defines a Scheimpflug configuration other similar configurations that take advantage of an extended-DOF are expressly contemplated. Accordingly, this description is meant to be taken only by way of example, and not to otherwise limit the scope of this invention.

What is claimed is:

1. A vision system for imaging feature sets on an object surface comprising:
   a first imaging system having at least a first image sensor and first optics, the first imaging system defining a standard, on-axis configuration having a system optical axis;
   a second imaging system defining an extended-depth of focus (DOF) configuration with second optics;
   a vision system processor that receives and processes image data from the first imaging system and the second imaging system; and
   a primary aimer assembly and a secondary aimer assembly that each project a discrete beam of structured light onto the surface in a relative relationship that indicates a focus distance with respect to the first imaging system and indicates an approximate center of the field of view of the second imaging system.

2. The vision system as set forth in claim 1 wherein the feature sets comprise identification (ID) codes.

3. The vision system as set forth in claim 2 wherein the first imaging system is arranged to image at least one of a second distance or a third distance distance and ID codes of a second size and the second imaging system is arranged to image at least one of a first distance and ID codes of a first size, the first distance being shorter than the second distance and the third distance, and the first size being smaller than the second size.

4. The vision system as set forth in claim 3 wherein the second imaging system is arranged according to a Scheimpflug configuration.

5. The vision system as set forth in claim 1 wherein the second imaging system has a mirror assembly that redirects a mounting location of the second image sensor to a location where a plane thereof is substantially parallel with a plane of the first image sensor.

6. The vision system as set forth in claim 5 wherein the primary aimer beam is projected substantially along the system optical axis.

7. The vision system as set forth in claim 6 wherein the mirror assembly includes a beam splitter that allows light to pass from the object surface to the first imaging system.

8. The vision system as set forth in claim 1 wherein the processor is arranged to identify a location of features in an image of the second imaging system and thereby determine a distance of the vison system from the object surface containing the imaged features.

9. The vision system as set forth in claim 8, further comprising a variable lens in the first optics and further comprising a control that sets a focus of the variable lens based upon the distance.

10. The vision system as set forth in claim 1 wherein the second imaging system defines an optical axis that is tilted with respect to the system axis in a Scheimpflug configuration.

11. The vision system as set forth in claim 1 wherein the primary aimer beam projects a structured light pattern defining at least endpoints of a line and the secondary aimer beam projects a structured light pattern defining a geometric shape adapted to cross the line when the first imaging system is in focus.

12. The vision system as set forth in claim 11 wherein the primary aimer beam approximately defines a first wavelength and the secondary aimer beam approximately defines a second wavelength that is visually distinct from the first wavelength.

13. The vision system as set forth in claim 12 wherein the primary aimer beam resides on the system optical axis of first optics of the first imaging system and the secondary aimer beam is oriented at an acute angle with respect to the system optical axis such that crosses the main aimer beam at a defined distance relative to a focal plane of the first optics.

14. A vision system for reading features of interest within a field of view on a surface having at least a first camera assembly that is adapted to focus on the surface, the system comprising:
   a primary aimer assembly that projects a primary aimer beam of structured light onto the surface, the primary aimer beam residing on an optical axis of a camera optics of the first camera; and
   a secondary aimer assembly that projects a secondary aimer beam of structured light onto the surface, the secondary aimer beam being orientated at an acute angle with respect to the optical axis, wherein the primary aimer beam and the secondary aimer beam are projected in a relative relationship that indicates a focus distance with respect to the first camera assembly.

15. The vision system as set forth in claim 14 wherein the secondary aimer beam crosses the primary aimer beam at a defined distance relative to a focal plane of the camera optics.

16. The vision system as set forth in claim 14 wherein the primary aimer beam defines a geometric pattern on the surface that approximately defines the field of view.

17. The vision system as set forth in claim 16 wherein the geometric pattern of the primary aimer beam is a line with endpoints at approximate edges of the field of view that is projected by a laser and optics assembly.

18. The vision system as set forth in claim 14 wherein the secondary aimer beam crosses the primary aimer beam approximately at a center of the field of view.

19. The vision system as set forth in claim 14 wherein the primary aimer beam and the secondary aimer beam project a combined pattern that represents a working distance range between the surface and the first camera assembly.

20. The vision system as set forth in claim 19 wherein the secondary aimer beam defines a controlled beam geometry so that the secondary aimer beam crosses the primary aimer beam along a range of distances between the surface and the first camera assembly that correspond approximately to the working distance range.

21. The vision system as set forth in claim 20 wherein the secondary aimer beam projects, onto the surface, a geometric shape with edges that align at opposing edges of the working distance range with a geometric shape projected by the primary aimer beam.

22. The vision system as set forth in claim 21 wherein the geometric shape projected by the secondary aimer beam defines at least one of a rectangle, a square, a regular polygon and an irregular polygon.

23. The vision system as set forth in claim 14, further comprising an emitter that projects the secondary aimer beam having a variable optics assembly that variably projects the beam so as to at least one of (a) adapt to different focus distance and (b) provide further information to the user based upon of a variable pattern of the projected secondary beam on the surface.

24. The vision system as set forth in claim 23 wherein the variable optics comprises at least one of a mechanically variable lens, liquid lens and variable LCD window.

25. The vision system as set forth in claim 14 wherein the primary aimer beam approximately defines a first wavelength and the secondary aimer beam approximately defines a second wavelength, visibly discrete from the first wavelength.

26. The vision system as set forth in claim 14 wherein the features of interest define direct park mark (DPM) codes.

27. The vision system as set forth in claim 14, further comprising a second camera assembly, wherein the camera optics of the first camera assembly is aligned on-axis and the optics of the second camera assembly defines a Scheimpflug relationship.

28. The vision system as set forth in claim 27 wherein the primary aimer beam and the secondary aimer beam are arranged to project onto the surface in a relative relationship that, at least one of (a) indicates an approximate center of the field of view of the second camera assembly, and (b) indicates an intersection of an optical axis of the first camera assembly relative to an optical axis of the second camera assembly.

29. A method for focusing a camera assembly for reading features on a surface with an image processor associated with the camera assembly comprising the steps of:

positioning the camera assembly with respect to the surface so as to align a projected shape of a primary aimer beam with respect to the features, the primary aimer beam residing along an optical axis of a first camera optics of the camera assembly; and adjusting a distance of the camera assembly from the surface so that a projected shape of a secondary aimer beam, oriented at an acute angle with respect to the optical axis, crosses the primary aimer beam, thereby indicating that the camera assembly is within an acceptable working distance range to read the features.

* * * * *